United States Patent
Yun

(10) Patent No.: US 6,624,957 B1
(45) Date of Patent: Sep. 23, 2003

(54) CIRCUIT FOR CONTROLLING THE WRITE CURRENT OF A MAGNETIC DISK RECORDING APPARATUS AND METHOD FOR OPTIMIZING THE WRITE CURRENT

(75) Inventor: Jong-Yun Yun, Suwon (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/514,164

(22) Filed: Feb. 28, 2000

Related U.S. Application Data

(62) Division of application No. 08/772,986, filed on Dec. 23, 1996, now Pat. No. 6,175,456.

(30) Foreign Application Priority Data

Dec. 21, 1995 (KR) .......................................... 1995-53518

(51) Int. Cl.[7] .............................. G11B 5/02; G11B 5/09; G11B 5/03
(52) U.S. Cl. .............................. 360/25; 360/46; 360/66; 360/53
(58) Field of Search .............................. 360/67, 53, 66, 360/31, 25, 46, 68

(56) References Cited

U.S. PATENT DOCUMENTS

| 4,821,125 | A |   | 4/1989  | Christensen et al. |        |
|-----------|---|---|---------|--------------------|--------|
| 5,107,378 | A |   | 4/1992  | Cronch et al.      |        |
| 5,121,262 | A |   | 6/1992  | Squires et al.     |        |
| 5,296,975 | A |   | 3/1994  | Contreras et al.   |        |
| 5,359,467 | A |   | 10/1994 | Nakamura           |        |
| 5,392,172 | A |   | 2/1995  | Yoshinaga et al.   |        |
| 5,440,433 | A |   | 8/1995  | Yun                |        |
| 5,500,774 | A |   | 3/1996  | Watanabe et al.    |        |
| 5,539,342 | A |   | 7/1996  | Gersbach et al.    |        |
| 5,600,500 | A | * | 2/1997  | Madsen et al.      | 360/46 |
| 5,687,036 | A | * | 11/1997 | Kassab             | 360/53 |

OTHER PUBLICATIONS

US 5,284,231, 2/1994, Shier et al. (withdrawn)

* cited by examiner

Primary Examiner—Regina N. Holder
(74) Attorney, Agent, or Firm—Robert E. Bushnell, Esq.

(57) ABSTRACT

A circuit for controlling a write current employed in a magnetic disk recording apparatus includes a write unit for delivering the write current to a plurality of magnetic heads to enable writing of data on surfaces of magnetic disks by the magnetic heads. The write current exhibits a first magnitude that varies in dependence upon a second magnitude exhibited by a driving current provided to a write current control terminal of the write unit. A control unit generates pulse width modulated signals having duty cycles corresponding to respective predetermined write current control values to indicate the write current. A write current adjusting unit receives the pulse width modulated signals and delivers the driving current to the write current control terminal of the write unit. The write current adjusting unit adjusts the second magnitude exhibited by the driving current in dependence upon the duty cycles of the pulse width modulated signals. The write current adjusting unit smoothes the pulse width modulated signals, and generates corresponding direct current voltage levels to adjust the second magnitude exhibited by the driving current.

43 Claims, 10 Drawing Sheets

CIRCUIT FOR CONTROLLING THE WRITE CURRENT OF A MAGNETIC DISK RECORDING APPARATUS AND METHOD FOR OPTIMIZING THE WRITE CURRENT

CROSS-REFERENCE TO RELATED APPLICATION

This application is a divisional application of U.S. application Ser. No. 08/772,986 filed in the U.S. Patent & Trademark Office on the December 23, 1996, U.S. application Ser. No. 08/772,986 now U.S. Pat. No. 6,175,456 being incorporated herein by reference. Also, this application makes reference to, incorporates the same herein, and claims priority and all benefits accruing under 35 U.S.C. 120 from the aforementioned U.S. application Ser. No. 08/772,986, filed on the December 23, 1996, entitled Circuit For Controlling the Write Current of a Magnetic Disk Recording Apparatus and Method For Optimizing The Write Current.

BACKGROUND OF THE INVENTION

The present invention relates to a magnetic disk recording apparatus, and more particularly, to a circuit for controlling the write current applied to magnetic heads (i.e., data transducers) to write data on magnetic disks of the magnetic disk recording apparatus.

A magnetic disk recording apparatus, such as a hard disk drive (HDD) or a floppy disk drive (FDD), is generally used as an auxiliary memory device for a computer system. A hard disk drive (HDD) usually has the capacity to stably store a large amount of data, and enables rapid access to stored data. As the writing density of magnetic disks for hard disk drives (HDDs) is continuously increased in order to increase data storage capacity, the magnetic heads must operate with a high degree of precision and therefore be very sensitive to a write current. Accordingly, the magnitude of the write current applied to the magnetic heads is a critical factor in the performance of the hard disk drive (HDD). For example, an increase in the magnitude of the write current causes an increase in the amplitudes of signals picked up by the magnetic heads when reading data from the disks.

Several references discuss the subject of write currents in a magnetic disk recording apparatus. U.S. Pat. No. 5,550,774 entitled Current Setting Circuit To Provide A Write Current To A Recording Apparatus issued to Watanabe et al is one such reference. In Watanabe et al. '774, a write current setting circuit for a magnetic recording apparatus employs a reduced number of integrated circuit (IC) pins by enabling an increase of the integrated circuit (IC) pins accompanying an increase in the number of modes to be kept to a minimum. According to these principles, when six external resistance elements are used to generate a sub-mode correction current, (2×n) modes can be set by (n+1) pins of the integrated circuit. While this type of conventional art provides merit in its own right, I note that it fails to address specific problems that plague the art. For example, I note that it fails to recognize that the amount of write current employed should be varied for each of the different magnetic heads and disks of a hard disk drive (HDD).

SUMMARY OF THE INVENTION

It is an object of the present invention to provide a write current control circuit and method capable of reducing errors when reading and writing data in a magnetic disk recording apparatus.

It is another object to provide a write current control circuit and method that can adaptively control the write current employed in a magnetic disk recording apparatus.

It is still another object to provide a write current control circuit and method for a magnetic disk recording apparatus that adjusts the write current to an optimum state without modifying the hardware structure of the magnetic disk recording apparatus.

It is yet another object to provide a write current optimizing method for automatically controlling the write current so that the write current is in an optimum state for each of the heads and disks of a magnetic disk recording apparatus.

To achieve these and other objects, the present invention provides a circuit for controlling a write current employed in a magnetic disk recording apparatus. The circuit includes a write unit for delivering the write current to a plurality of magnetic heads to enable writing of data on surfaces of magnetic disks by the magnetic heads. The write current exhibits a first magnitude that varies in dependence upon a second magnitude exhibited by a driving current provided to a write current control terminal of the write unit. A control unit generates pulse width modulated signals having duty cycles corresponding to respective predetermined write current control values to indicate the write current. A write current adjusting unit receives the pulse width modulated signals and delivers the driving current to the write current control terminal of the write unit. The write current adjusting unit adjusts the second magnitude exhibited by the driving current in dependence upon the duty cycles of the pulse width modulated signals. The write current adjusting unit smoothes the pulse width modulated signals, and generates corresponding direct current voltage levels to adjust the second magnitude exhibited by the driving current.

These and other objects can also be achieved in accordance with the principles of the present invention with a method for optimizing a write current employed in a magnetic disk recording apparatus. In the method, a predetermined number of read tests are performed and a number of data errors generated during each one of the read tests is detected. Each one of the read tests is performed for a corresponding one of a plurality of different write current control values, and each one of the write current control values represents a different magnitude of the write current. An optimum write current control value is defined based on one or more of the write current control values corresponding to a minimum number of the data errors.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
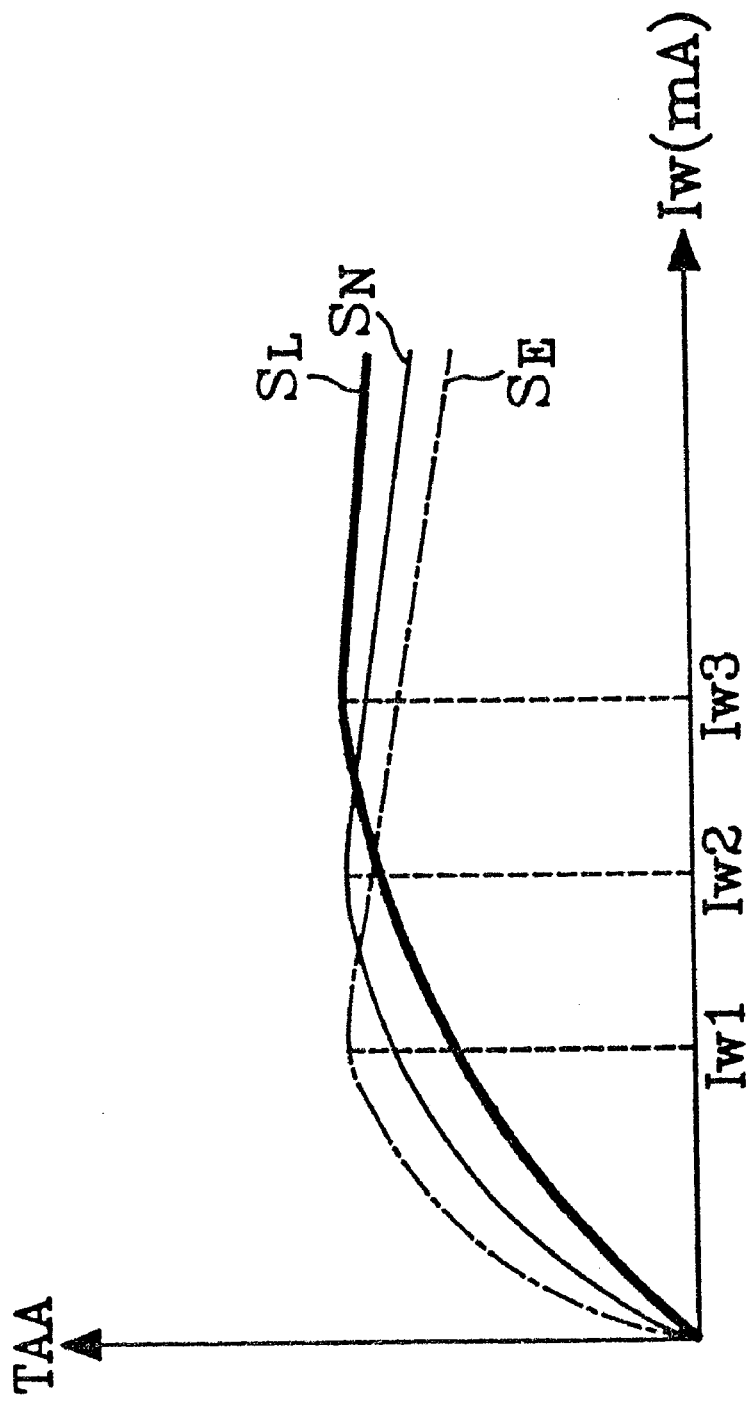
FIG. 1 illustrates the saturation characteristic curves of three exemplary heads.

Turning now to the drawings and referring to FIG. 1, the saturation characteristic curves of three exemplary heads are illustrated. In FIG. 1, the track average amplitude (TAA) characteristics of the heads may be classified into three categories with the write current Iw. For example, assume that the curve $S_N$ represents a head with a normal saturation characteristic, the curve $S_E$ represents a head with an early saturation characteristic, and the curve $S_L$ represents a head with a late saturation characteristic. In this case, the magnitudes of write current which provide an optimum read/write operation are: Iw1 for the head having the characteristic curve $S_E$, Iw2 for the head having the characteristic curve $S_N$, and Iw3 for the head having the characteristic curve $_LS$. The different saturation characteristics are caused by different assembly tolerances, pole widths and flying heights of the heads.

Therefore, when the write current is set to a single value for different heads, the heads supplied with an improper write current may make data errors. For example, assuming that there are two kinds of heads that respectively exhibit the best operational characteristics at write current values of 10 mA and 15 mA, and that the write current is set to a value of 10 mA for the design and manufacture of a magnetic disk recording apparatus employing the two heads, the latter head operates in an improper condition, thus generating more data errors in the read/write operations.

The disks used in various hard disk drives (HDDs) are usually different in diameter and recording frequencies, so that they should be applied with different magnetic field forces generated by different write currents. Moreover, most hard disk drives (HDDs) employ two kinds of recording methods respectively referred to as "constant-density recording" and "zone-bit recording". Constant-density recording is a method of improving the storage capacity of a disk by making all of the disk tracks have substantially the same data density, thereby making it possible for a disk to store more data per track than a conventional constant-track-capacity recording technique. With constant-density recording, the data storage region of a disk is divided into a plurality of annular zones which have their respective constant recording densities in the radial direction from the center of the disk.

Figure 2:
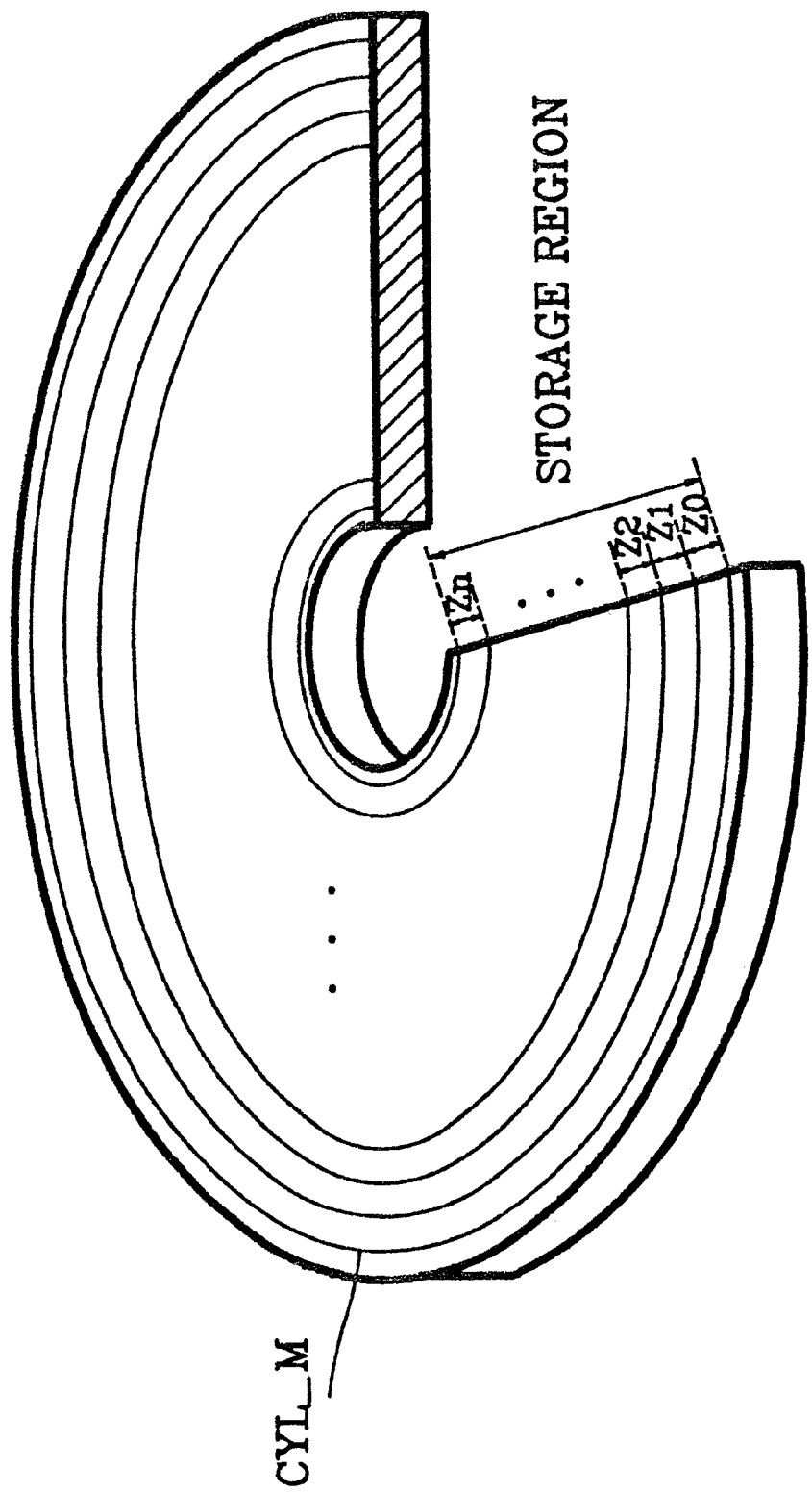
FIG. 2 illustrates the data recording zones formed on one surface of a magnetic disk employing constant-density recording.

Referring to FIG. 2, the data recording zones formed on one surface of a magnetic disk employing constant-density recording are illustrated. In FIG. 2, the data storage region is divided into n+1 annular zones Z0-Zn in the radial direction from the center. The outermost zone, cylinder CYL_M, is reserved as a maintenance cylinder to record essential data necessary for the maintenance of the magnetic disk recording apparatus. This essential data may be, for example, a list of defects in the sectors of the disk, the data of spare sectors, parameters of the read/write channels, etc. Typically, a microcontroller provided as a main control device of a hard disk drive (HDD) retrieves the parameters of the read/write channels from a read only memory (ROM), and stores them in the maintenance cylinder CYL_M for use in data read/write operations.

Constant-density recording, however, suffers a drawback in that each of the zones has a different recording density because of a different radius and angular velocity according to the position on the disk. Namely, an inner radial zone has a greater recording density than an outer radial zone. As a result, data interferences are a more serious threat in a high density recording zone than in a low density recording zone. Accordingly, when the write current is set to a relatively large value, data errors may be caused by interference between data bits in a high density recording zone. Alternatively, when the write current is set to a relatively small value, the amplitudes of the signals picked up by the head when reading data are too small to prevent noise, thereby resulting in data errors. Therefore, to prevent this problem, the write current must be set to have different values in different hard disk drives (HDDs), and also according to the characteristics of the heads and disks of a single hard disk drive (HDD).

Nevertheless, conventional hard disk drives (HDDS) utilize a-single fixed write current. More specifically, a hard disk drive (HDD) is generally provided with a read/write circuit connected with a plurality of magnetic heads. One of the heads is selected to pick up a signal that is preamplified to generate a corresponding analog signal when reading data from a magnetic disk surface, and to receive the write current to write encoded data onto the disk surface. The read/write circuit is generally constructed from a single integrated circuit (IC) chip, examples of which are SSI 32R221OR/2211R/2212R manufactured by Silicon Systems Co. Such a read/write circuit has a write current control terminal WC provided to externally control the write current, wherein the write current is determined by the resistance value of an external resistor connected to the write current control terminal. For example, when the write current is represented by Iw, and the resistance value is represented by Rwc, the write current is determined by equation (1) as follows:

$$Iw = Av \times \frac{Vwc}{Rwc} \quad (1)$$

Av is a constant representing the gain of a current mirror circuit provided in the read/write circuit, and Vwc represents the voltage at a junction point between the write current control terminal and the resistor. Therefore, Vwc/Rwc represents the electrical current flowing out from the write current control terminal WC through the resistor.

Accordingly, the value of the write current Iw varies with the value of the resistance value Rwc.

Conventionally, the resistance value Rwc is fixedly set in accordance with a particular hard disk drive (HDD), so that the hardware structure of every hard disk drive (HDD) must be changed in order to employ a correct resistor that generates a proper write current. Furthermore, it has been impossible to change the resistance value so as to accommodate the characteristics of different heads and disks. Alternatively, a technique has been developed to selectively connect the write current control terminal with one of several different resistors. Although this technique provides the ability to select one of several different write current values, it is impossible to properly change the value of the write current according to the characteristics of the heads and disks.

In order to solve these problems, Korean Patent Application No. 2820/1991 discloses a circuit for controlling the write current of a magnetic disk recording apparatus, wherein a digital-to-analog converter (DAC) is employed to control the write current to exhibit different values according to the recording zones of the disks. In this case, the number of steps for adjusting the value of the write current should be increased to obtain a properly functioning hard disk drive (HDD). Thus, in the case of Korean Patent Application No. 2820/1991, the resolution capability of digital-to-analog converter (DAC) must be improved, which is too difficult and too expensive to employ. In addition, this approach does not consider changing the write current value according to the characteristics of the heads. Moreover, changing the write current according to the characteristics of the heads and disks of a hard disk drive (HDD) may only be-possible provided that all the heads and the recording zones of the disks be tested so as to select the proper write current. To this end, the hard disk drives (HDDs) must be tested, thus decreasing reliability.

Figure 3:
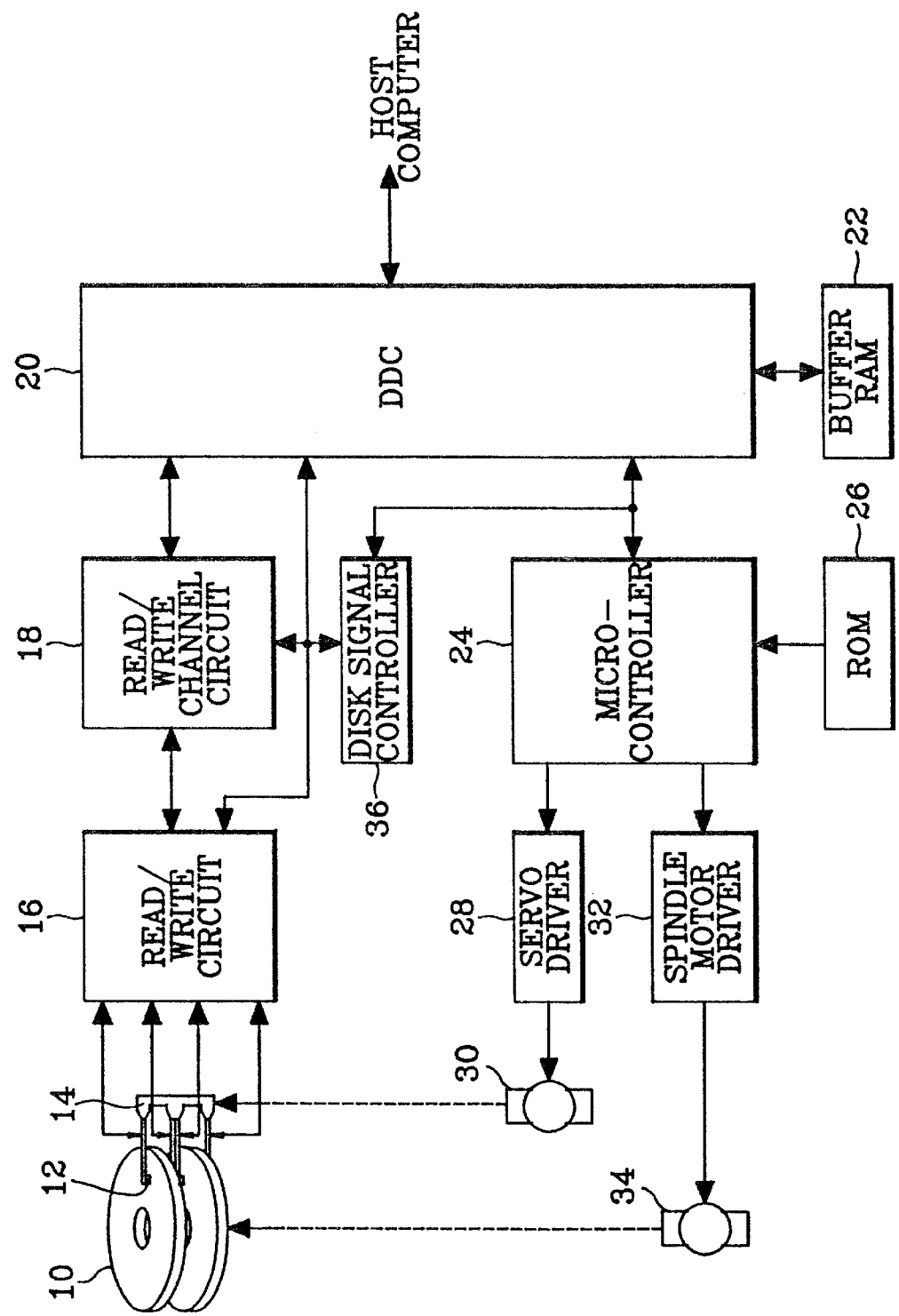
FIG. 3 is a block diagram illustrating the construction of a hard disk drive (HDD)

Referring now to FIG. 3, a block diagram showing a hard disk drive (HDD) is shown. In FIG. 3, two magnetic disks 10 are stacked on a single spindle driven by a spindle motor 34. Each surface of the disks 10 is associated with one of four magnetic heads 12, which are respectively supported by support arms of an E-block assembly 14 that is connected with a rotary voice coil actuator 30.

The heads 12 are connected with a read/write circuit 16, which preamplifies the signals picked up from the disks 10 by the heads 12 to generate analog read signals applied to a read/write channel circuit 18. Read/write circuit 16 also applies the write current to the heads 12 to write encoded recording data received from the read/write channel circuit 18 onto the disks 10. Read/write circuit 16 includes a head switching circuit for selecting one of the heads 12 according to a selection signal generated by a disk signal controller 36. Also provided in the read/write circuit 16 is a write current control terminal not shown in FIG. 3.

Read/write channel circuit 18 detects a read signal delivered by the read/write circuit 16 to decode the data pulse applied to a disk data controller MDDC) 20, and encodes write data supplied from the disk data controller (DDC) 20 to apply the encoded write data to the read/write circuit 16.

Disk data controller (DDC) 20 is controlled by a microcontroller 24 so as to deliver data from a host computer, such as personal computer, through the read/write channel circuit 18 and the read/write circuit 16 to the disks 10, and vice versa. In addition, disk data controller (DDC) 20 interfaces the communications between the host computer and microcontroller 24. A buffer random access memory (RAM) 22 is provided to temporarily store data transferred between the host computer and the microcontroller 24 and the read/write channel circuit 18.

Microcontroller 24 controls the disk data controller (DDC) 20 in response to a read or write command received from the host computer, and also enables the searching and pursuing of tracks. A read only memory (ROM) 26 is provided to store programs executed by the microcontroller 24, together with various set values.

A servo drive 28 generates a drive current for driving the actuator 30 in response to a control signal that is provided by the microcontroller 24 to control the positions of the heads 12. The actuator 30 moves the heads 12 over the surfaces of disks 10 according to the level and direction of the drive current. A spindle motor driver 32 drives a spindle motor 34 to rotate the disks 10 under the control of microcontroller 24. Disk signal controller 36 decodes the servo data of read data delivered from the read/write channel circuit 18, and applies the decoded servo data to the microcontroller 24. Disk signal controller 36 also generates various control signals necessary for the read/write operations, and applies the control signals to the read/write circuit 16 and read/write channel circuit 18 under the control of the disk data controller (DDC) 20 and microcontroller 24. Disk signal controller 36 is usually constructed from an application specific integrated circuit (ASIC) designed to suit a hard disk drive (HDD).

Figure 4:
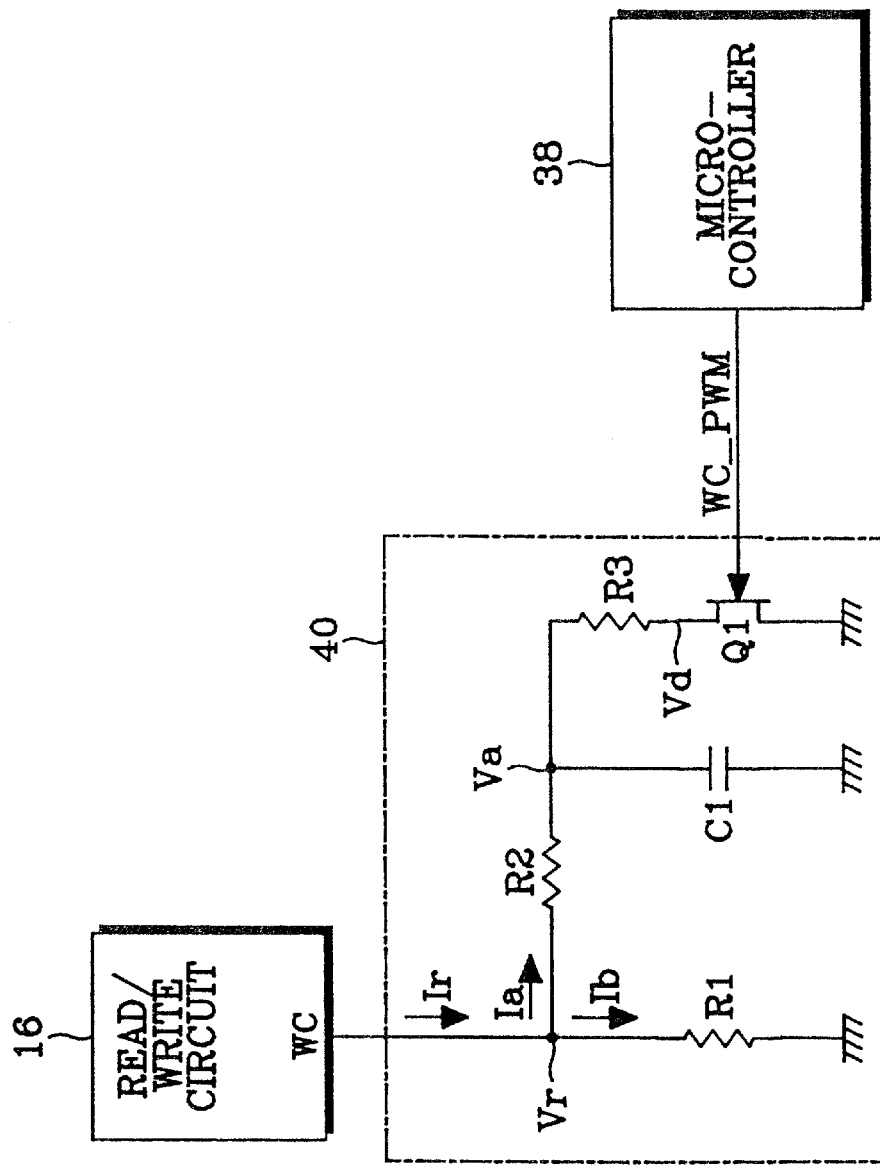
FIG. 4 is a circuit for controlling the write current of a hard disk drive (HDD) according to the principles of the present invention.
Figure 6:
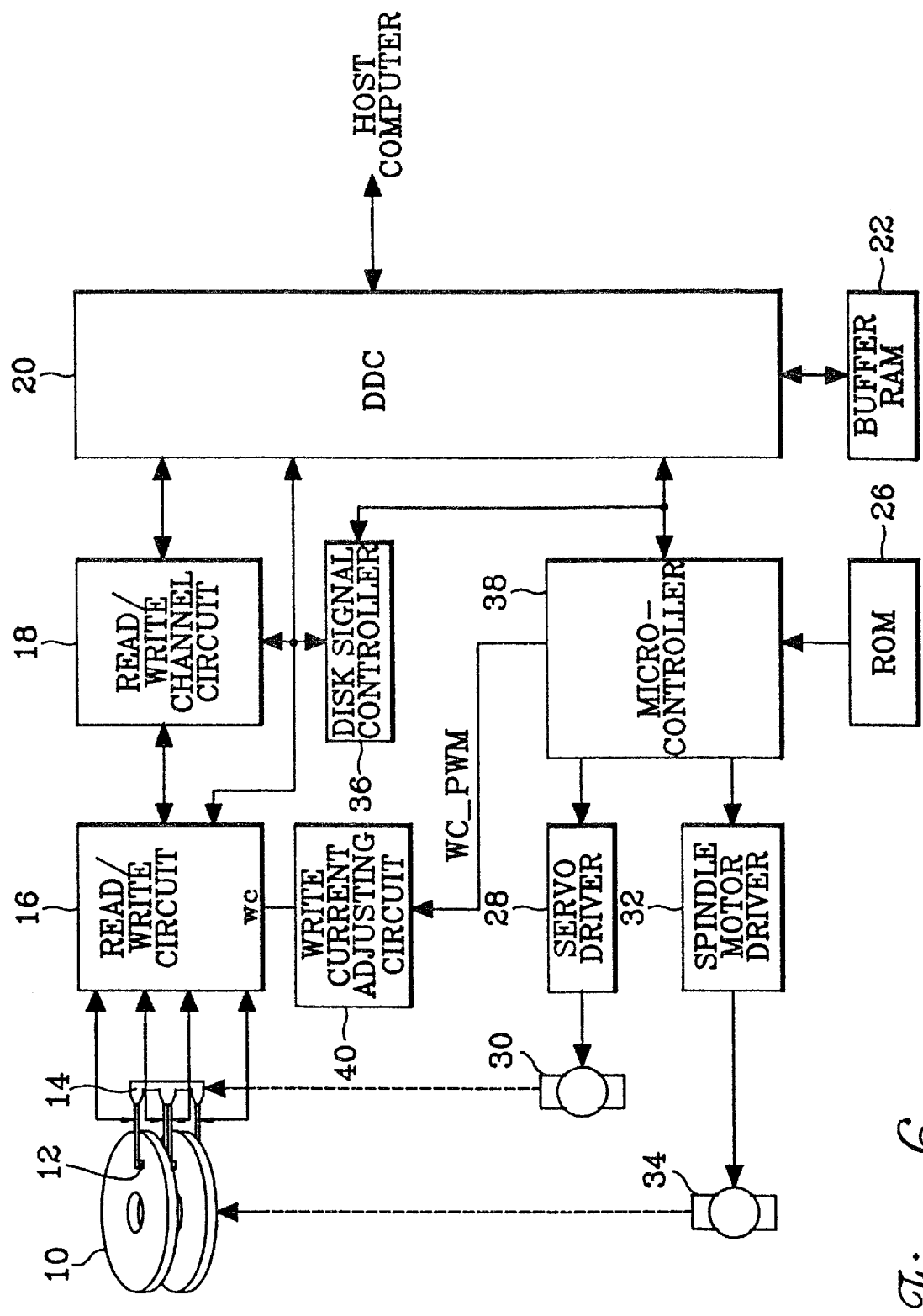
FIG. 6 is a block diagram illustrating the construction of a hard disk drive (HDD) employing the inventive circuit of FIG. 4.

FIG. 4 shows a circuit for controlling the write current of a hard disk drive (HDD) according to the principles of the present invention. FIG. 6 is a block diagram illustrating the construction of a hard disk drive (HDD) employing the inventive circuit of FIG. 4. In FIG. 6, all of the components having the same reference number as the components of FIG. 3 are the same, and have substantially the same function. Note, however, that FIG. 3 employs microcontroller 24, while FIG. 6 employs a microcontroller 38 whose function will hereinafter be described.

In FIGS. 4 and 6, microcontroller 38 generates pulse width modulated (PWM) signals WC_PWM with duty cycles corresponding to respective predetermined write current control values in order to determine the write current. The microcontroller 38 employed in the present invention is capable of generating pulse width modulated (PWM) signals, and may be embodied using a N80C198-16 MHz chip manufactured by the Intel Co. The duty cycles may be adjusted using a period of 32 $\mu$s. The inventive hard disk drive (HDD) of FIG. 6 differs from the hard disk drive (HDD) of FIG. 3 in that it additionally includes a write current adjusting circuit 40, and employs the microcontroller 38 with means for generating pulse width modulated (PWM) signals.

The write current control values have optimum values according to the characteristics of the heads 12 and the data storage zones of the disks 10. The optimum write current control values are stored in the maintenance cylinder CYL_M of the disk, as shown in FIG. 2. Microcontroller 38 generates a pulse width modulated (PWM) signal WC_PWM having a duty cycle determined by the optimum write current control value representing the data zone of the disk 10 where the head 12 is to write data. Accordingly, the pulse width modulated (PWM) signal WC_PWM may have different duty cycles based on the heads 12 and the recording zones of the disks 10.

Write current adjusting circuit 40 adjusts the current of the write current control terminal WC of the read/write circuit 16 according to the duty cycles of the pulse width modulated (PWM) signals WC_PWM provided from microcontroller 38. Write current adjusting circuit 40 includes a first resistor R1 connected between the write current control terminal WC and a ground potential, a second resistor R2 connected in series with the first resistor R1 and in series with a capacitor C1, and a transistor Q1 with a gate for connecting or disconnecting a third resistor R3 (connected to a junction of the second resistor R2 and the capacitor C1) with a ground potential according to the pulse width modulated (PWM) signals WC_PWM. Transistor Q1 may be embodied using an N-channel field effect transistor (FET). In particular, the third resistor R3 is connected to or disconnected from the ground potential depending upon whether the pulse width modulated (PWM) signal WC_PWM is in a high or low state.

The operation of the write current control circuit of FIG. 4 will now be described in detail with reference to FIG. 5. In FIG. 4, Ir represents the current flowing through the write current control terminal WC of the read/write circuit 16, Ia represents the current through the second resistor R2, Ib represents the current through the first resistor R1, Vr represents the voltage of the junction between the write current control terminal WC and the first resistor R1, Va represents the voltage of the junction between the second resistor R2 and the capacitor C1, and Vd represents the voltage of the drain of transistor Q1. In this case, the voltage Vr is constantly supplied from the read/write circuit 16.

Figure 5:
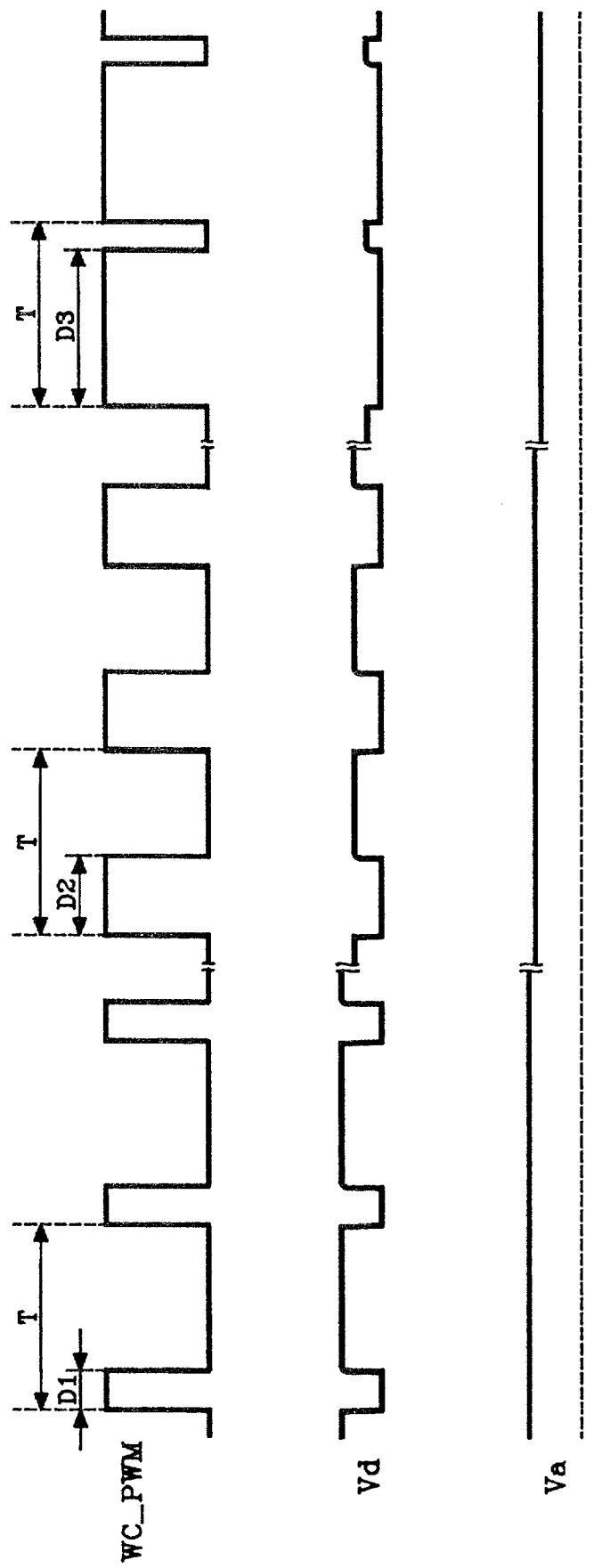
FIG. 5 illustrates the operational waveforms of the essential components of FIG. 4.

The pulse width modulated (PWM) signal WC_PWM generated from microcontroller 38 is pulsed as shown in FIG. 5. Specifically, FIG. 5 illustrates and identifies three distinct pulse width odulated (PWM) signals WC_PWM, each having a different duty cycle. Reference numeral T represents a single period of the pulse width modulated (PWM) signal WC_PWM, which would be 32 μs in the case of using the N80C198-16 MHz chip as microcontroller 38. Reference numerals D1–D3 represent three distinct intervals defining duty cycles of the pulse width modulated (PWM) signals WC_PWM. The durations of intervals D1–D3 are such that D1<D2<D3.

Transistor Q1 of the write current adjusting circuit 40 is switched on and off by the pulse width modulated (PWM) signal WC_PWM. Namely, the third resistor R3 is connected to or disconnected from the ground potential based on whether the pulse width modulated (PWM) signal WC_PWM is in a high or low state. Accordingly, the voltage applied to the drain of transistor Q1 is pulsed so that the level of the voltage Va of the junction between the second resistor R2 and capacitor C1 characterizes direct current inversely proportional with the duty cycles of the pulse width modulated (PWM) signals WC_PWM. Namely, the level of the voltage Va corresponds inversely with the smoothed level of the pulse width modulated (PWM) signal WC_PWM.

Accordingly, the current Ir is expressed by the following equation (2):

$$Ir = Ia + Ib = \frac{Vr - Va}{R2} + \frac{Vr}{R1} \quad (2)$$

where R1 and R2 represent the respective values of the first second resistors R1 and R2. Vr is the same as Vwc equation (1), and Ir the same Vwc/Rwc in equation (1).

Substituting equation (2) into equation (1), the write current Iw may be expressed by the following equation (3):

$$Iw = Av \times \left(\frac{Vr - Va}{R2} + \frac{Vr}{R1}\right) \quad (3)$$

Hence, the write current Iw applied to heads 12 varies with the voltage Va. In this manner, microcontroller 38 may control the value of the write current Iw by generating the pulse width modulated (PWM) signals WC_PWM with duty cycles corresponding to the respective optimum write current control values for the zones of the surface of the disk 10 where a head 12 is to write data.

The duty cycle of the pulse width modulated (PWM) signal may be adjusted by changing the values of pulse width modulated (PWM) registers in microcontroller 38. For example, when the voltage Vr is 2V, the gain Av is 25, the value of the second resistor R2 is 1.2 kΩ, and the value of the first resistor R1 is 12.7 kΩ, the values of the pulse width modulated (PWM) registers are changed through nine steps to obtain the values of the write current Iw as shown in Table (1). Of course, the data of Table (1) varies according to the particular hard disk drive (HDD).

TABLE 1

| Values of PWM registers | Va | Ia | Ir | Iw |
|---|---|---|---|---|
| 00 h | 2.000 V | 0.0000 mA | 0.15748 mA | 3.94 mA |
| 20 h | 1.786 V | 0.1783 mA | 0.33578 mA | 8.39 mA |
| 40 h | 1.604 V | 0.3300 mA | 0.48748 mA | 12.19 mA |
| 60 h | 1.464 V | 0.4466 mA | 0.60408 mA | 15.10 mA |
| 80 h | 1.348 V | 0.5433 mA | 0.70078 mA | 17.52 mA |
| A0 h | 1.246 V | 0.6283 mA | 0.78578 mA | 19.64 mA |
| C0 h | 1.162 V | 0.6983 mA | 0.85598 mA | 21.39 mA |
| E0 h | 1.086 V | 0.7617 mA | 0.91918 mA | 22.98 mA |
| FF h | 1.022 V | 0.8150 mA | 0.97248 mA | 24.31 mA |

Thus, the write current Iw is adjusted according to the pulse width modulated (PWM) signals WC_PWM, so that the adjustment may be readily made with more precision, as compared to the conventional method using an additional digital-to-analog converter (DAC).

Figure 7:
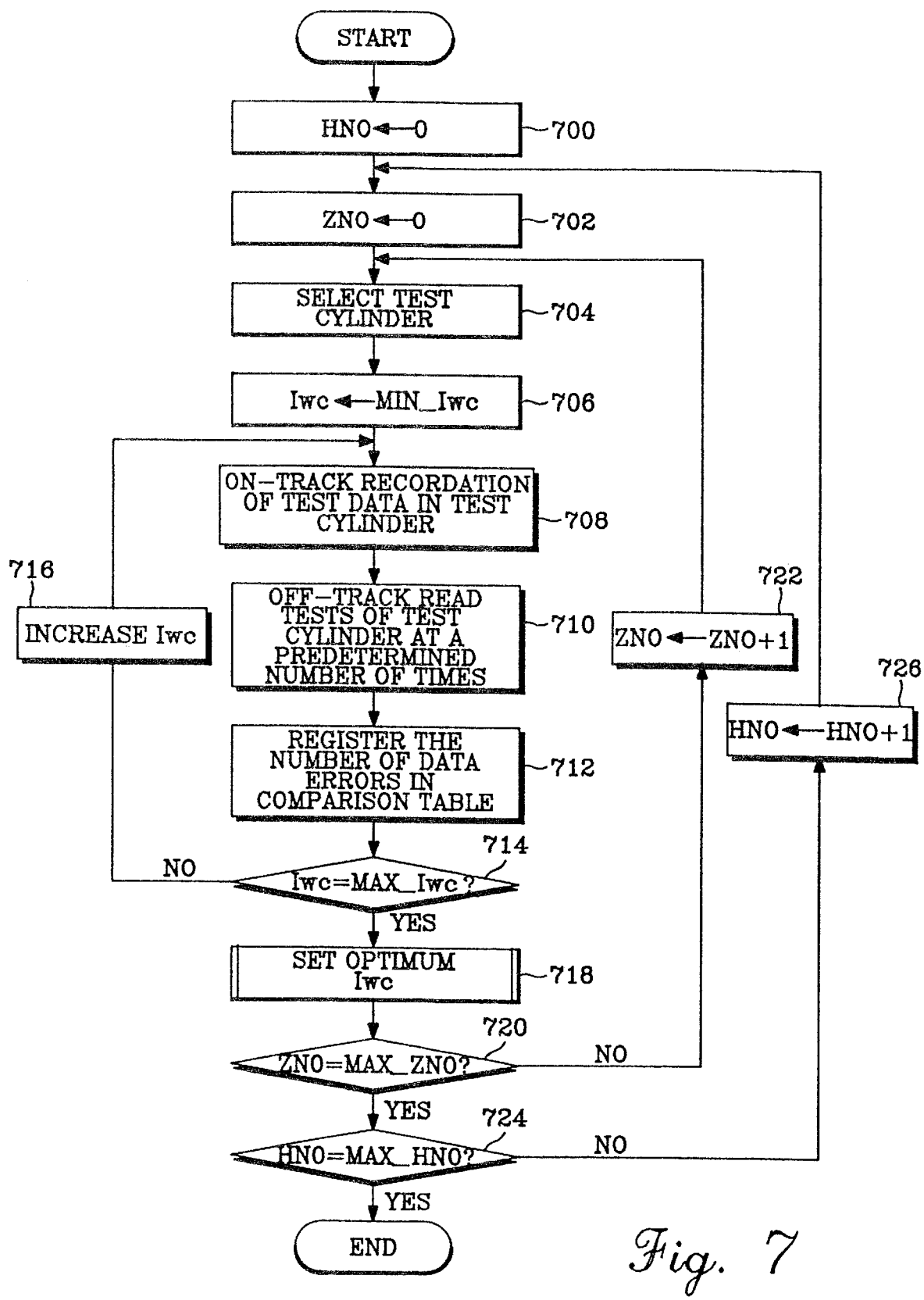
FIG. 7 is a flow chart illustrating the steps for optimizing the write current according to the principles of the present invention.

The process for determining the optimum write current control values according to the characteristics of the heads 12 and disks 10 of the inventive hard disk drive (HDD) shown in FIG. 6 will now be described with reference to FIG. 7. The operational steps of the flow chart of FIG. 7 are programmed in the read only memory (ROM) 26, and executed as a self-test in a "burn-in" process which serves to scan defects of the disks 10.

Microcontroller 38 sets head No. HNO as "0" in step 700, and sets zone No. ZNO as "0" in step 702 in order to sequentially determine the optimum write current values for the zones of the disks 10 associated with the respective heads 12. Then, the read/write circuit 16 selects the head represented by head No. HNO according to a signal applied from disk signal controller 36 controlled by the microcontroller 38.

In step 704, microcontroller 38 selects a test cylinder among the cylinders of the selected zone. In this case, it is preferable to select the cylinder having the highest recording density as the test cylinder. This represents the worst operational condition in the zone. Such a cylinder would be the innermost cylinder. Of course, the test cylinder must not have any defects.

In steps 706 to 716, microcontroller 38 performs read tests for each of the predetermined write current control values by increasing the write current control value from a minimum write current control value MIN_Iwc to a maximum write current control value MAX_Iwc in a step by step manner. The number of error occurrences for each write current control value are registered in a comparison table. Microcontroller 38 generates the pulse width modulated (PWM) signal WC_PWM having the duty cycle increase with the write current control value, thereby changing the write current of the read/write circuit 16.

More specifically, the minimum write current control value MIN_Iwc is set into a pulse width modulated (PWM) register as the write current control value Iwc in step 706. The test data is then recorded as on-track data in the test cylinder in step 708 using the write current control value Iwc. Next, the data read tests are performed in an off-track state for the test cylinder at a predetermined number of times in step 710. The data read tests are performed in an off-track state to add stress to the test conditions, thereby increasing the possibility of data errors. The number of data errors is registered in the comparison table in step 712. The comparison table is established by the registers or random access memories (RAMS) provided in microcontroller 38, and stores the number of errors for each write current control value Iwc. In step 714, the write current control value Iwc is compared with the maximum write current control value MAX_Iwc. When the write current control value Iwc is not equal to the maximum write current control value MAX_Iwc, the write current control value Iwc is increased by a predetermined step value in step 716, and logical flow returns to step 708. In this manner, the test is performed for a single data zone.

When the write current control value Iwc is equal to the maximum write current control value MAX_Iwc, the optimum write current control value is set for the given zone in step 718 based on the number of error occurrences for each write current control value Iwc. There are several methods for determining the optimum write current control value. A few of these methods will now be described.

Figure 8:
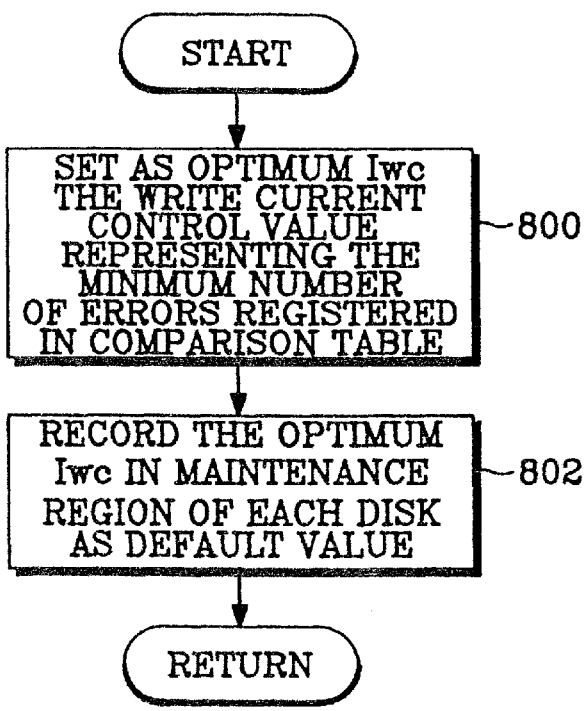
FIG. 8 is a flow chart illustrating the steps for determining the optimum write current control value according to a first embodiment of the present invention.
Figure 9:
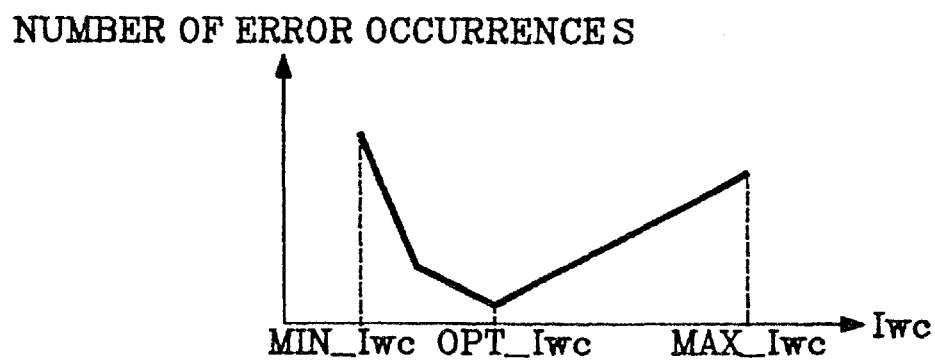
FIG. 9 is a graph illustrating the optimum write current control value determined according to the flow chart of FIG. 8.

First, referring to FIGS. 8 and 9, the write current control value Iwc representing the minimum number of the errors registered in the comparison table is defined as the optimum write current control value in step 800. That is, when there is only one write current control value that represents the minimum number of errors, that write current control value is defined as the optimum write current control value, OPT_Iwc, as shown in FIG. 9. The optimum write current control values are recorded in maintenance region CYL_M of each disk as default values in step 802 to enable data write control.

Figure 10:
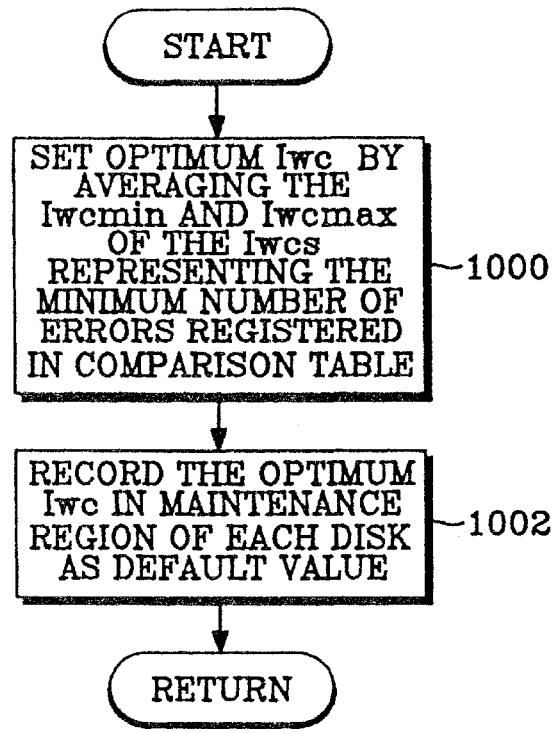
FIG. 10 is a flow chart illustrating the steps for determining the optimum write current control value according to a second embodiment of the present invention.
Figure 11:
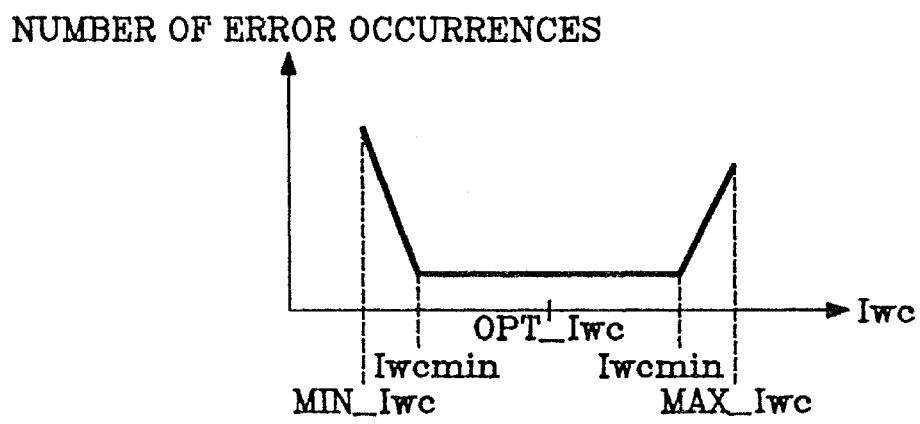
FIG. 11 is a graph illustrating the optimum write current control value determined according to the flow chart of FIG. 10.

Secondly, referring to FIGS. 10 and 11, the optimum write current control value is obtained in step 1000 by averaging the minimum and maximum write current control values of the write current control values representing the minimum number of the errors registered in the comparison table. That is, when there are two or more write current control values representing the minimum number of errors, as shown in FIG. 11, the minimum and the maximum write current control values Iwcmin and Iwcmax are averaged to determine the optimum write current control value OPT_Iwc. The optimum write current control values are recorded in maintenance region CYL_M of each disk as default values in step 1002 to enable data write control.

Figure 12:
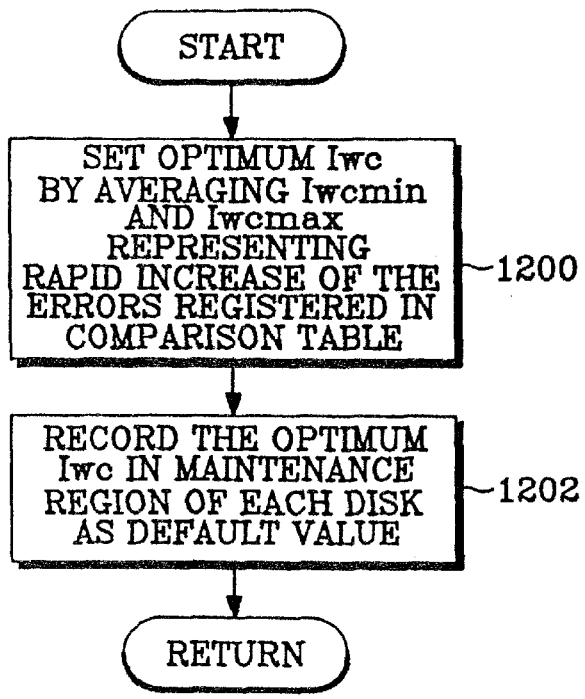
FIG. 12 is a flow chart illustrating the steps for determining the optimum write current control value according to a third embodiment of the present invention.
Figure 13:
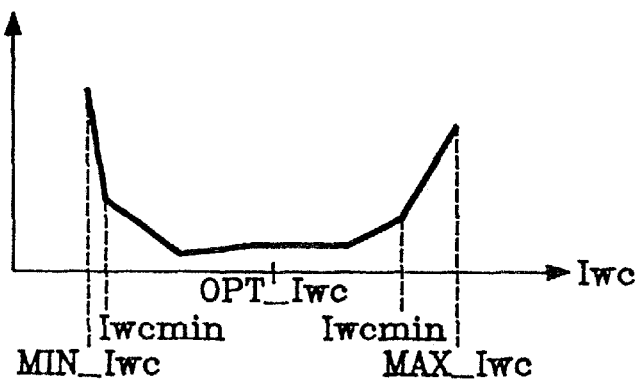
FIG. 13 is a graph illustrating the optimum write current control value determined according to the flow chart of FIG. 12.

Thirdly, referring to FIGS. 12 and 13, the optimum write current control value OPT_Iwc is obtained by averaging the minimum and maximum write current control values Iwcmin and Iwcmax representing points where errors increase most rapidly, in step 1200. This technique can be employed in situations where it is difficult to precisely obtain the write current control values representing the minimum number of errors, as shown in FIG. 13. The optimum write current control values are recorded in maintenance region CYL_M of each magnetic disk as default values in step 1202.

Returning back to FIG. 7, after the optimum write current control value OPT_Iwc is obtained and set for the given zone of a disk 10 associated with the given head 12 in step 718, a determination is made as to whether the zone number ZNO is equal to a maximum zone number MAX_ZNO in step 720. When the zone number ZNO is not equal to the maximum zone number MAX_ZNO, the zone number ZNO is incremented by one in step 722, and logical flow returns to step 704 so that the optimum write current control values may be set for all zones of a disk associated with a head. However, when the zone number ZNO has reached the maximum zone number MAX_ZNO, a determination is made as to whether the head number HNO is equal to a maximum head number MAX_HNO in step 724. When the head number HNO is not equal to the maximum head number MAX_HNO, the head number HNO is incremented by one in step 726, and logical flow returns to step 702. In this manner, the optimum write current control values are set for all of the zones of the disks 10 associated with the respective heads 10 of the hard disk drive (HDD).

In the operation of FIG. 7, the test data has a predetermined pattern to facilitate the checking of characteristics in response to the write current, and may be obtained by using a sample hard disk drive (HDD). The off-track value may also be predetermined so as to apply a suitable stress to the reading operation. In this manner, the range of write current control values Iwc is set sufficiently wide by using a sample hard disk drive (HDD) within a predetermined range of the write current control value of the read/write circuit 16.

Accordingly, microcontroller 38 enables data writing by generating the pulse width modulated (PWM) signals WC_PWM with duty cycles to suit the respective optimum write current control values for the zones of the disk 10 associated with a head 12. Hence, the inventive circuit provides means for optimizing the write current so as to suit the characteristics of the heads and disks of a hard disk drive (HDD) without changing the hardware structure of each magnetic disk recording apparatus, thereby reducing errors in reading/writing data. Moreover, since the write current is adjusted according to the pulse width modulated (PWM) signals, the adjustment process is accomplished with more simplicity and precision than in the case of using a conventional digital-to-analog converter (DAC). Of course, the inventive circuit may also be applied to floppy disk drives (FDDs) without substantial modifications. Furthermore, it is possible to use the circuit for adjusting the write current according to the pulse width modulated (PWM) signal selectively for the heads and the zones of the disks.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A method for optimizing a write current employed in a magnetic disk recording apparatus, comprising steps of:

performing a predetermined number of read tests and detecting a number of data errors generated during each one of said read tests, each one of said read tests being performed for a corresponding one of a plurality of different write current control values, each one of said write current control values representing a different magnitude of said write current;

defining an optimum write current control value based on one or more of said write current control values corresponding to a minimum number of the data errors a write unit delivering said write current to a plurality of magnetic heads to enable writing of data by said magnetic heads on surfaces of magnetic disks each characterized by a major surface exhibiting a plurality of recording zones formed on each said major surface, with each of said heads exhibiting a minimal number of errors at corresponding particular values of said write current, said write current exhibiting a first magnitude that varies in dependence upon a second magnitude exhibited by a driving current provided to a write current control terminal of said write unit;

a control unit separately generating pulse width modulated signals each having duty cycles corresponding to respective said particular values for individual ones of said plurality of magnetic heads, to indicate said write current; and a write current adjusting unit receiving said pulse width modulated signals and delivering said driving current to said write current control terminal of said write unit, said write current adjusting unit applying said driving current to said control terminal to provide to selected individual ones of said heads corresponding said particular values byadjusting the second magnitude exhibited by said driving current in dependence upon said duty cycles of said pulse width modulated signals.

2. The method as claimed in claim 1, wherein when more than one of said write current control values corresponds to the minimum number of the data errors, said optimum write current control value is obtained by averaging a minimum one and a maximum one of said write current control values corresponding to the minimum number of the data errors.

3. The method as claimed in claim 2, wherein said optimum write current control value is recorded in a maintenance region of a magnetic disk as a default value to enable performance of a data write control operation.

4. The method as claimed in claim 3, wherein said read tests are performed in an off-track state.

5. The method as claimed in claim 1, wherein said performing and defining steps are repeatedly performed to obtain said optimum write current control value for each of a plurality of data zones arranged along a surface of a magnetic disk.

6. The method as claimed in claim 5, wherein said performing and defining steps are repeatedly performed to further obtain a plurality of optimum write current control values for each of a plurality of magnetic heads that respectively correspond to a plurality of magnetic disk surfaces employed in said magnetic disk recording apparatus.

7. The method as claimed in claim 1, comprising a write current adjusting unit that smoothes said pulse width modulated signals and generates corresponding direct current voltage levels to adjust a second magnitude exhibited by said driving current.

8. The method as claimed in claim 7, wherein said write current adjusting unit comprises:

a first resistor connected between said write current control terminal and a local reference potential;

a capacitor connected to the local reference potential;

a second resistor connected between the local reference potential and a junction that connects said first resistor and said capacitor; and a switching element having a control terminal for receiving said pulse width modulated signals from said control unit, said switching element selectively connecting and disconnecting said second resistor to and from the local reference potential according to said pulse width modulated signals.

9. The circuit as claimed in claim 8, wherein said write current control values have optimum values to operate respective ones of magnetic heads at optimum conditions.

10. The circuit as claimed in claim 9, wherein said optimum values are set in accordance with respective zones of said magnetic disks.

11. The circuit as claimed in claim 10, wherein said control unit generates said pulse width modulated signals with the duty cycles to meet said optimum values.

12. The circuit as claimed in claim 11, wherein said control unit comprises a microcontroller having an output terminal for transmitting said pulse width modulated signals.

13. A method for optimizing a write current employed in a magnetic disk recording apparatus, comprising steps of:

performing a predetermined number of read tests and detecting a number of data errors generated during each one of said read tests, each one of said read tests being performed for a corresponding one of a plurality of different write current control values, each one of said write current control values representing a different magnitude of said write current; and defining an optimum write current control value by averaging a minimum one and a maximum one of said write current control values representing points where the data errors increase most rapidly.

14. The method as claimed in claim 13, wherein said optimum write current control value is recorded in a maintenance region of a magnetic disk as a default value to enable performance of a data write control operation.

15. The method as claimed in claim 14, wherein said read tests are performed in off-track state.

16. The method as claimed in claim 13, wherein said performing and defining steps are repeatedly performed to obtain said optimum write current control value for each of a plurality of data zones arranged along a surface of a magnetic disk.

17. The method as claimed in claim 16, wherein said performing and defining steps are repeatedly performed to further obtain a plurality of optimum write current control values for each of a plurality of magnetic heads that respectively correspond to a plurality of magnetic disk surfaces employed in said magnetic disk recording apparatus.

18. A method for controlling a write current employed in a magnetic disk recording apparatus, said method comprising steps of:

performing a predetermined number of read tests by spanning said magnetic disk and detecting a number of data errors generated during each one of said read tests, each one of said read tests being performed for a corresponding one of a plurality of different write current control values, each one of said write current control values representing a different magnitude of said write current; and defining an optimum write current control value based on one or more of said write current control values corresponding to a minimum number of the data errors;

generating pulse width modulated signals having duty cycles corresponding to said write current control values to indicate said write current;

generating a driving current having a magnitude that varies in dependence upon the duty cycles of said pulse width modulated signals; and delivering said write current to a magnetic head to enable writing of data on a surface of a magnetic disk by said magnetic head, said write current having a magnitude that varies in dependence upon the magnitude of said driving current.

19. The method as claimed in claim 18, wherein when more than one of said write current control values corresponds to the minimum number of the data errors, said optimum write current control value is obtained by averaging a minimum one and a maximum one of said write current control values corresponding to the minimum number of the data errors.

20. The method as claimed in claim 19, wherein said optimum write current control value is recorded in a maintenance region of a magnetic disk as a default value to enable performance of a data write control operation.

21. The method as claimed in claim 20, wherein said read tests are performed in an off-track state.

22. The method as claimed in claim 18, wherein said performing and defining steps are repeatedly performed to obtain said optimum write current control value for each of a plurality of data zones arranged along a surface of a magnetic disk.

23. The method as claimed in claim 22, wherein said performing and defining steps are repeatedly performed to further obtain a plurality of optimum write current control values for each of a plurality of magnetic heads that respectively correspond to a plurality of magnetic disk surfaces employed in said magnetic disk recording apparatus.

24. The method as claimed in claim 18, comprising a write current adjusting unit that smoothes said pulse width modulated signals and generates corresponding direct current voltage levels to adjust a second magnitude exhibited by said driving current.

25. The method as claimed in claim 24, wherein said write current adjusting unit comprises:

a first resistor connected between said write current control terminal and a local reference potential;

a capacitor connected to the local reference potential;

a second resistor connected between the local reference potential and a junction that connects said first resistor and said capacitor; and a switching element having a control terminal for receiving said pulse width modulated signals from said control unit, said switching element selectively connecting and disconnecting said second resistor to and from the local reference potential according to said pulse width modulated signals.

26. The circuit as claimed in claim 25, wherein said write current control values have optimum values to operate respective ones of magnetic heads at optimum conditions.

27. The circuit as claimed in claim 26, wherein said optimum values are set in accordance with respective zones of said magnetic disks.

28. The circuit as claimed in claim 27, wherein said control unit generates said pulse width modulated signals with the duty cycles to meet said optimum values.

29. The circuit as claimed in claim 28, wherein said control unit comprises a microcontroller having an output terminal for transmitting said pulse width modulated signals.

30. A method for controlling a write current employed in a magnetic disk recording apparatus, said method comprising steps of:

performing a predetermined number of read tests and detecting a number of data errors generated during each one of said read tests, each one of said read tests being performed for a corresponding one of a plurality of different write current control values, each one of said write current control values representing a different magnitude of said write current; and defining an optimum write current control value by averaging a minimum one and a maximum one of said write current control values representing points where the data errors increase most rapidly;

generating pulse width modulated signals having duty cycles corresponding to said write current control values to indicate said write current;

generating a driving current having a magnitude that varies in dependence upon the duty cycles of said pulse width modulated signals; and delivering said write current to a magnetic head to enable writing of data on a surface of a magnetic disk by said magnetic head, said write current having a magnitude that varies in dependence upon the magnitude of said driving current.

31. The method as claimed in claim 30, wherein said optimum write current control value is recorded in a maintenance region of a magnetic disk as a default value to enable performance of a data write control operation.

32. The method as claimed in claim 31, wherein said read tests are performed in off-track state.

33. The method as claimed in claim 30, wherein said performing and defining steps are repeatedly performed to obtain said optimum write current control value for each of a plurality of data zones arranged along a surface of a magnetic disk.

34. The method as claimed in claim 33, wherein said performing and defining steps are repeatedly performed to further obtain a plurality of optimum write current control values for each of a plurality of magnetic heads that respectively correspond to a plurality of magnetic disk surfaces employed in said magnetic disk recording apparatus.

35. The method as claimed in claim 30, comprising a write current adjusting unit that smoothes said pulse width modulated signals and generates corresponding direct current voltage levels to adjust a second magnitude exhibited by said driving current.

36. The method as claimed in claim 35, wherein said write current adjusting unit comprises:

a first resistor connected between a write current control terminal and a local reference potential;

a capacitor connected to the local reference potential;

a second resistor connected between the local reference potential and a junction that connects said first resistor and said capacitor; and a switching element having a control terminal for receiving said pulse width modulated signals from a control unit, said switching element selectively connecting and disconnecting said second resistor to and from the local reference potential according to said pulse width modulated signals.

37. The circuit as claimed in claim 36, wherein said write current control values have optimum values to operate respective ones of magnetic heads at optimum conditions.

38. The circuit as claimed in claim 37, wherein said optimum values are set in accordance with respective zones of said magnetic disks.

39. The circuit as claimed in claim 38, wherein said control unit generates said pulse width modulated signals with the duty cycles to meet said optimum values.

40. The circuit as claimed in claim 39, wherein said control unit comprises a microcontroller having an output terminal for transmitting said pulse width modulated signals.

41. A magnetic disk recording apparatus, comprising:

a read/write unit reading and writing data onto and from surfaces of a magnetic disk, said read/write unit writing test data onto each one of a plurality of sectors on said surfaces of said magnetic disk at varying write currents for each sector, said read/write unit reading said test data and determining the number of errors in each write;

a controller generating pulse width modulated signals each having duty cycles and causing said read/write unit to write at varying write currents said test data for each sector and causing said read/write unit to read said written test data and determine the number of errors in said read for each write current for each sector, said control unit analyzing said error data from said read/write unit and determining an optimum write current from said data for each sector by averaging a minimum one and a maximum one of said write control values corresponding to the minimum number of data errors; and a write current adjusting unit receiving pulse width modulated signals having duty cycles from said controller and delivering varying write currents to said read/write unit.

42. The apparatus of claim 41, said read/write unit, under the control of said controller, writing said optimum write unit for each sector on said magnetic disk.

43. The apparatus of claim 41, said write current adjusting unit comprising:

a first resistor connected between a write current control terminal and a local reference potential;

a capacitor connected to the local reference potential;

a second resistor connected between the local reference potential and a junction that connects said first resistor and said capacitor;

a switching element having a control terminal for receiving said pulse width modulated signals from said control unit, said switching element selectively connecting and disconnecting said second resistor to and from the local reference potential according to said pulse width modulated signals.

* * * * *